J. H. SAGER.
BUMPER FOR AUTOMOBILES.
APPLICATION FILED JUNE 29, 1918. RENEWED MAY 26, 1920.
1,345,554.
Patented July 6, 1920.
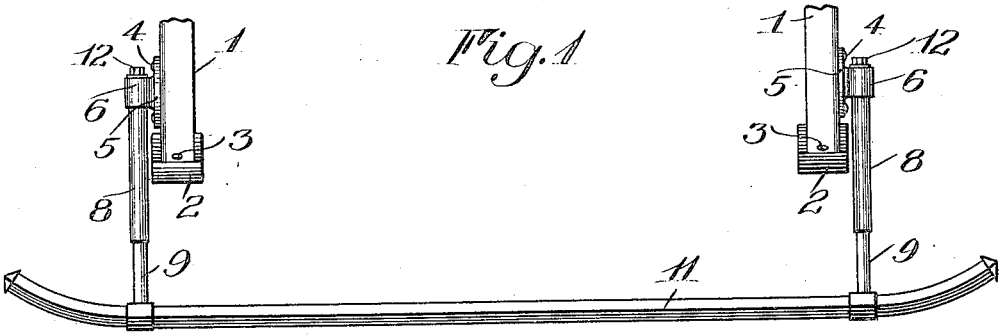
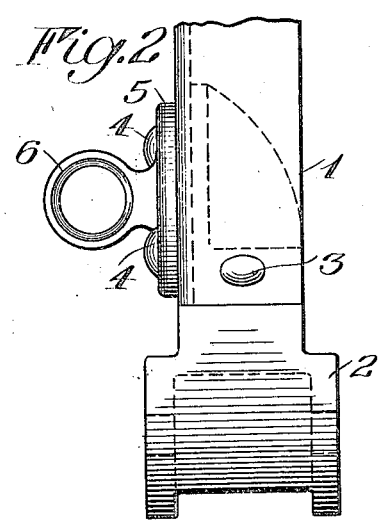
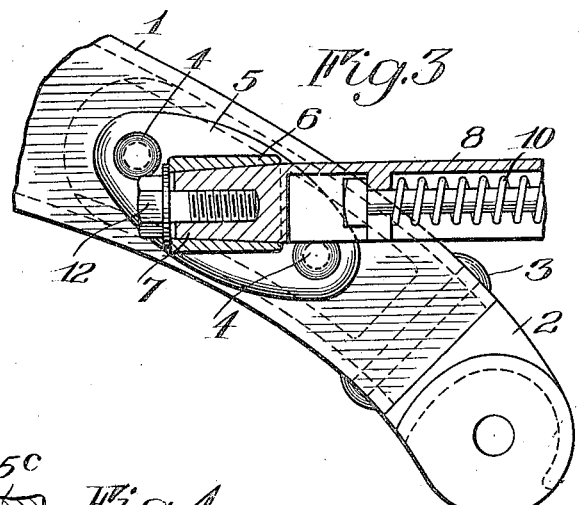
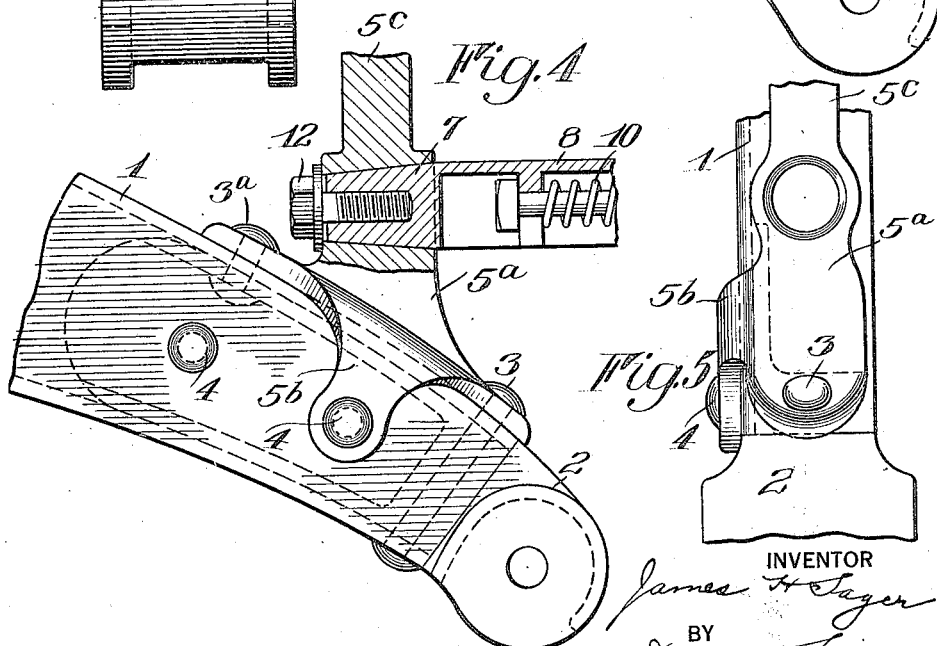
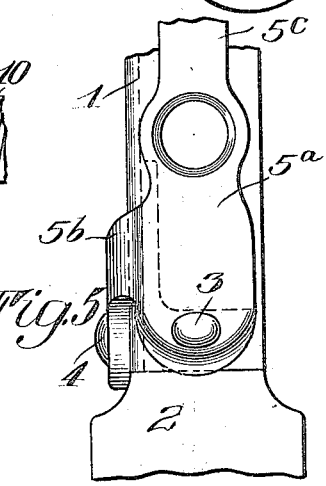
INVENTOR
James H Sager
BY
Davis & Simms
his ATTORNEYS

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION.

BUMPER FOR AUTOMOBILES.

1,345,554.  Specification of Letters Patent.  Patented July 6, 1920.

Original application filed April 23, 1917, Serial No. 163,997. Divided and this application filed June 29, 1918, Serial No. 242,657. Renewed May 26, 1920. Serial No. 384,507.

*To all whom it may concern:*

Be it known that I, JAMES H. SAGER, a citizen of the United States, and resident of Rochester, in the county of Monroe and State of New York, have invented certain new and useful Improvements in Bumpers for Automobiles, of which the following is a specification.

The present invention relates to bumpers for automobiles and more particularly to the type disclosed in an application filed by me on April 23, 1917, Serial No. 163,997, of which this application is a division, an object of this invention being to provide socket members for the bumper supporting arms, separate from the brackets to which the vehicle springs are secured, mounted in positions where they will be able to sustain the strains thereon, while at the same time not interfering with other parts of the vehicle. Another object of the invention is to utilize the fastening devices which secure the bracket to which the springs are secured for also securing the socket brackets.

To these and other ends, the invention consists of certain parts and combinations of parts, all of which will be hereinafter described, the novel features being pointed out in the appended claims.

In the drawings:—

Figure 1 is a plan view of the two forward ends of the side bars of a vehicle with a bumper supported thereon in accordance with the present invention;

Fig. 2 is an enlarged front view of one of the side bars showing the position of the socket bracket thereon;

Fig. 3 is a side view, partially in section, of the same parts with the bumper supporting arms secured thereto;

Fig. 4 is a side view, partially in section, of another embodiment of the invention; and Fig. 5 is a front view of the embodiment shown in Fig. 4, the bumper supporting arm being removed.

Referring more particularly to the drawings, 1 indicates the channeled side frame bars of an automobile, and 2 the brackets to which the usual springs of the automobile are secured, these brackets 2 projecting into and from the channeled frame bars and being riveted at 3 and 4 to said frame bars.

According to the embodiment of the invention shown in Figs. 1 to 3, each frame bar has a bumper supporting bracket 5 secured to its outer face by rivets 4, which secure the bracket 2 to the frame bar 1. Each bracket 5 is provided with a socket portion 6, the inner wall of the socket being tapered about a horizontal axis and receiving the tapered end 7 of a bumper supporting arm. The latter comprises, in this instance, an inner member 8 and an outer member 9 guided on the inner member and having a spring 10 surrounding the same and acting to take up the shock imposed on the bumper bar 11, which connects the two outer members 9 on the opposite sides of the vehicle. A bolt 12 has screw-threaded engagement with the tapered portion 7 of the bumper supporting arm and tends to draw the tapered portion into firm engagement with the tapered walls of the socket 6.

In the embodiment of the invention shown in Figs. 4 and 5, the channeled frame bar 1 has, as in the other embodiment, the bracket 2 at its outer end for the attachment of the vehicle spring, said bracket being secured to the frame bar by rivets 3, 4 and 3ª. In this embodiment of the invention, the socket member 5ª abuts the upper face of the channeled frame bar 1 and is secured permanently to the frame bar by rivets 3 and 3ª, as well as one of the rivets 4, the bracket being extended downwardly at 5ᵇ on the outer side of the frame bar for connection with the rivet 4. The bracket 5ª has a tapered socket for receiving the tapered end 7 of a bumper supporting arm which may be constructed and secured in the same manner as like parts in Figs. 1 to 3. The bracket 5ª may have an extension 5ᶜ in order to serve as a support for a lamp, or mud guard, or both.

In both of the illustrated embodiments of the invention the socket brackets are each secured to the forward curved end of a channeled frame bar by the rivets or fastening devices which secure a bracket to which a forward vehicle spring is secured. With this arrangement the socket brackets are permanently attached to the frame of the vehicle, thus dispensing with all clips which are liable to work loose, and with all adjustments heretofore employed to permit the horizontal position of the bumper supporting arms, so that the cost of manufacture of the bumper may be reduced. The socketed brackets will be arranged in definite position with reference to the treads of the forward wheels by the designers of the different automobiles, and the manufacturers of the bumpers can then construct the supporting arms of a standard length so that the bumper bars will lie at the outer position with reference to the treads of the wheels. In the embodiment shown in Figs. 1 to 3, the socket brackets are arranged on the outer faces of the vehicle frame bars where the bumper will not interfere with other parts of the vehicle, and in the embodiment shown in Figs. 4 and 5, the bumper socket may be utilized as a lamp bracket, and at the same time is positioned on the curved forward end so that thrust on the bumper will be transmitted to such curved end.

What I claim as my invention and desire to secure by Letters Patent is:—

1. In combination with a pair of channeled frame bars of a vehicle, arranged with their channels opposed, two bumper supporting brackets permanently secured to the outer faces of said bars and each having a socket, the sockets of the two brackets having their longitudinal axes parallel and horizontally arranged and a bumper bar having two supporting arms, each rigidly secured against movement in one of the sockets and provided with resilient means permitting the movement of the bumper bar relatively to the rigidly secured end of its supporting arm.

2. In combination with a channeled frame bar of a vehicle, a bracket to which a vehicle spring is secured, a bumper supporting bracket, and fastening means common to the first named bracket and the bumper supporting bracket for securing both parts to the channeled frame bar.

3. In combination with a channeled frame bar of a vehicle, a bracket having a portion projecting into the channel of the frame bar and a portion projecting from said frame bar to which a spring is secured, fastening devices securing the portion in the channel to the frame bar, and a bumper supporting bracket secured by said fastening devices and having a socket whose longitudinal axis is horizontally arranged and parallel with the axis of the channeled frame bar.

4. In combination with a channeled frame bar of a vehicle, a bracket having a portion projecting into the channel of the frame bar and a portion projecting from said bar to which a spring is secured, fastening devices securing the portion in the channel of the frame bar, and a bumper supporting bracket abutting the outer face of the channeled frame bar and held thereto by said fastening devices, said bumper supporting bracket having a socket whose longitudinal axis extends in the direction of the length of the frame bar.

5. In combination with a channeled frame bar of a vehicle, having a curved end, a bracket having a portion fitting in said frame bar and a portion projecting therefrom to which a spring is secured, fastening devices securing said portion of the bracket within the channel bar, and a bumper supporting bracket secured to said curved end by said fastening devices and having a socket with its axis horizontal and above the projecting portion of the first named bracket.

6. In combination with a channeled frame bar of a vehicle, having a curved forward end, a bracket secured on said channeled frame bar to project therefrom for securing to a vehicle spring, a bumper supporting bracket secured to the curved end of the frame bar in rear of the first named bracket and having a socket whose axis is above the projecting end of the first named bracket and is horizontally arranged and a supporting arm for a bumper bar secured rigidly at one end against movement in the socket and provided with resilient means permitting the move of the bumper bar relatively to the rigidly secured end of the supporting arm.

7. In combination with a channeled frame bar having a curved forward end, a bracket secured in said channeled frame bar and projecting therefrom for securing to a vehicle spring, a bumper supporting bracket abutting the upper face of the curved end of the channel bar and having a socket whose axis is horizontally arranged and a supporting arm for a bumper bar secured rigidly at one end against movement in the socket and provided with resilient means permitting the movement of the bumper bar relatively to the rigidly secured end of the supporting arm.

8. In combination with a channeled frame bar having a curved forward end, a bracket secured in said channeled frame bar and projecting therefrom for securing to a vehicle spring, devices for securing said first named bracket in said frame bar, and a bumper supporting bracket secured by said devices and abutting the curved upper face of the end of the frame bar.

9. In combination with a channeled frame bar having a curved forward end, a bracket secured in said channeled frame bar and projecting therefrom for securing to a vehicle spring, devices for securing said first named bracket in said frame bar, and a bumper supporting bracket secured by said devices and abutting the upper face of the curved end of the frame bar, said bumper supporting bracket having an extension above the socket to serve as a lamp support, or mud guard brace, or both.

JAMES H. SAGER.